(12) United States Patent
DeMartino

(10) Patent No.: US 7,768,938 B2
(45) Date of Patent: Aug. 3, 2010

(54) SYSTEMS AND METHODS FOR PROVIDING MULTIPLE COMMUNICATION SERVICES OVER EXISTING TWISTED PAIR ACCESS LINES

(75) Inventor: Kevin A. DeMartino, Bedford, MA (US)

(73) Assignee: Verizon Services Corp., Ashburn, VA (US)

( * ) Notice: Subject to any disclaimer, the term of this patent is extended or adjusted under 35 U.S.C. 154(b) by 915 days.

(21) Appl. No.: 11/503,048

(22) Filed: Aug. 11, 2006

(65) Prior Publication Data

US 2006/0274734 A1 Dec. 7, 2006

Related U.S. Application Data

(63) Continuation-in-part of application No. 10/961,705, filed on Oct. 7, 2004.

(60) Provisional application No. 60/708,993, filed on Aug. 17, 2005, provisional application No. 60/510,672, filed on Oct. 10, 2003.

(51) Int. Cl.
*H04L 12/26* (2006.01)
(52) U.S. Cl. .................. 370/252; 370/352; 370/401
(58) Field of Classification Search .................. None
See application file for complete search history.

(56) References Cited

U.S. PATENT DOCUMENTS

| | | | |
|---|---|---|---|
| 6,987,769 B1 * | 1/2006 | Dougherty et al. | 370/401 |
| 7,099,349 B1 * | 8/2006 | Phillips et al. | 370/442 |
| 7,266,122 B1 * | 9/2007 | Hogg et al. | 370/395.41 |
| 7,330,888 B2 * | 2/2008 | Storry et al. | 709/224 |
| 7,346,071 B2 * | 3/2008 | Bareis | 370/445 |

* cited by examiner

*Primary Examiner*—Michael J Moore, Jr.

(57) ABSTRACT

Systems and methods are described for providing a plurality of communication services over existing access lines such as twisted pair access lines. These services include voice, audio/video, and data communication services, the so-called "triple play" of services. The use of existing communication lines enables these services to be provided at a relatively low cost. Remote terminals are located close to subscriber premises to reduce the length of the existing communication lines connecting subscribers to the network. Data associated with a plurality of communication services may be statistically multiplexed onto the communication lines. Subscribers are provided with the capability to dynamically select services, including the capability to select audio/video signals from a set containing audio/video broadcast signals. The systems and methods enable data to be transported efficiently through the backbone network interconnecting central offices. Capabilities comparable to the capabilities of coaxial cable systems are provided at a lower cost than alternative approaches, such as running fiber all the way to the subscriber premises.

21 Claims, 10 Drawing Sheets

Achievable ADSL Data Rate VS Length of Twisted Pair Access Line

| Length of TP Access Line | ADSL Downstream Data Rate |
|---|---|
| 9000 ft | 9 Mb/s |
| 12000 ft | 6 Mb/s |
| 16000 ft | 2 Mb/s |
| 18000 ft | 1.5 Mb/s |

*FIG. 2*
*(PRIOR ART)*

Achievable VDSL Data Rate VS Length of Twisted Pair Access Line

| Length of TP Access Line | VDSL Downstream Data Rate |
|---|---|
| 1000 ft | 52 Mb/s |
| 3000 ft | 26 Mb/s |
| 4500 ft | 13 Mb/s |

*FIG. 3*
*(PRIOR ART)*

Network Service Options

| Service Option | Broadcast Capability | ADSL Capability |
|---|---|---|
| Option 1 | 24.5 Mb/s<br>1 HDTV & NTSC channels | 1.5 Mb/s<br>1 MPEG-1 VOD channel |
| Option 2 | 20 Mb/s<br>1 HDTV channel | 6 Mb/s<br>2 MPEG-2 VOD channels |
| Option 3 | 13 Mb/s<br>3 NTSC channels | 13 Mb/s<br>3 MPEG VOD channels |

*FIG. 9*

SYSTEMS AND METHODS FOR PROVIDING MULTIPLE COMMUNICATION SERVICES OVER EXISTING TWISTED PAIR ACCESS LINES

RELATED APPLICATIONS

This application claims priority from U.S. application Ser. No. 60/510,672, filed Oct. 10, 2003, U.S. application Ser. No. 10/961,705, filed on Oct. 7, 2004, and U.S. application Ser. No. 60/708,993 filed Aug. 17, 2005, the contents of all of which are incorporated herein in their entirety.

BACKGROUND

I. Introduction

Communication services are often defined as: voice and telephony; video, which include video-on-demand and broadcast video and associated audio; and data communications, such as computer communications. Providing combined voice, audio/video, and data communication services is popularly referred to as providing "the triple play."

Telephone networks with twisted pair communication lines have been traditionally designed to support voice communications. Recent developments in technology have provided the ability to support high speed data communications over traditional telephone networks. However, telephone networks using such twisted pair lines are at a significant disadvantage compared to coaxial cable (cable TV) networks. Cable connections to subscribers can support much higher bandwidths than twisted pair telephone lines. With the advent of digital subscriber line (DSL) technology, the data rates that can be support by twisted pair lines can be significantly increased. However, these rates currently fall far short of the rates that can be supported by coaxial cable systems.

To be able to compete with the cable companies in providing the triple play, the telephone companies need to further expand the capacity of the access lines and to support an audio/video broadcast capability comparable to the capability provided by the cable systems. Fiber-to-the-premise (FTTP) or fiber-to-the-home (FTTH) is the ultimate solution. However, FTTP is very expensive and will take many years to fully deploy. The telephone companies need a solution that is less expensive than FTTP and that can be deployed more quickly.

II. Telephone Networks

A telephone network includes a plurality of access networks that connect subscriber nodes to central offices (COs) and an interoffice network that interconnects the COs as illustrated in FIG. 1. A subscriber node is located on an opposite end of the access line from the CO. The illustration in FIG. 1 depicts a smaller conventional telephone network with a few COs and a small number of subscriber access lines per CO. A larger telephone network includes thousands of COs and many more access lines per CO.

In the conventional interoffice network, the COs are interconnected by fiber optic cables having multiple fibers. Each fiber supports multiple Synchronous Optical Network (SONET) channels that are time division multiplexed. In some cases, a fiber also supports multiple wavelength division multiplexed (WDM) channels that support multiple SONET channels. As shown in FIG. 1, an interoffice network typically is defined by a mesh topology. A pattern of interlocking SONET rings is superimposed on the underlying mesh topology so that data flows are constrained to follow the SONET rings. On the SONET ring, data flows in two directions, which enables a data flow to be quickly re-established if a failure occurs along the SONET ring.

Regardless of whether the interoffice network is a ring-based or a mesh-based topology, the interoffice network must have sufficient capacity to handle the data flows to and from the access network. Throughput of data through conventional interoffice network is usually limited by the capacity of the access networks. There is a desire for network capacity to be substantially increased and used more effectively in order to support the additional bandwidth requirements of integrated communication services including voice communications, data communications, audio/video-on-demand, and broadcast audio/video.

A conventional telephone network includes many subscriber nodes connected to a class 5 CO (end office) by one or more pairs of copper wires that are twisted together to reduce interference such as electromagnetic coupling to other wires. The maximum bandwidth of a signal that can be transmitted over twisted pair access lines is limited to approximately 4 KHz for typical distances between a telephone network subscriber and the corresponding telephone central office.

In some cases, the twisted pair access lines are terminated in a remote terminal in the telephone network subscribers' general geographical area, where signals on multiple subscriber lines are digitized, multiplexed onto a fiber, and sent to the CO. This latter type access is referred to as a digital loop carrier (DLC) system. COs for a common carrier wireline network support an average of approximately 12,000 subscriber access lines, which include twisted pair lines from subscriber nodes to the CO and from subscriber nodes to a DLC remote terminal. Large business enterprise customers may have fiber optic access lines running from the CO to the subscriber node as part of the SONET access ring.

III. Access Networks

In the past, bandwidth on most twisted pair access lines was limited to 4 KHz, which limits the equivalent data rate to approximately 64 Kb/s or less. Bandwidth was increased using the Integrated Services Digital Network (ISDN) basic rate interface (BRI) that supports a data rate of approximately 144 Kb/s over a twisted pair access line configured to support ISDN.

With the advent of digital subscriber line (DSL) techniques, bandwidth has been further expanded beyond the traditional 4 KHz limit and data rates in the megabit per second range can be supported over twisted pair access lines. Despite the enhanced capabilities provided by DSL, conventional access networks still limit network services as currently configured. The data rates that can be supported by DSL fall off rapidly as the length of the twisted pair lines between a CO and a subscriber node increases. Consequently, high DSL data rates are supported only for subscriber nodes that are relatively close to the CO.

The term digital subscriber line (DSL) refers to a set of techniques that enable high data rates to be transmitted over twisted pair access lines. Although there are a number of variations of DSL, two types of DSL are relevant here, asymmetric DSL (ADSL) and very high speed DSL (VDSL).

A. ADSL Access Networks

ADSL involves relatively long twisted pair access lines running from the subscriber node to the CO with a relatively wide bandwidth assigned for downstream traffic (CO to subscriber node) and a relatively narrow bandwidth assigned for upstream traffic (subscriber node to CO).

FIG. 2 shows the downstream data rates that can be supported with ADSL as a function of the length of the twisted pair access line. These rates are for the case of 24-gauge wire and upstream rates about ten percent (10%) of the downstream rates. As clearly shown by FIG. 2, the data rates supported by DSL decrease rapidly as the length of the access line increases.

A typical access line between the CO and the subscriber node, however, suffers from various degradations. For example, the use of narrower gauge wire, bridged taps, poor splices, and loading coils considerably reduces the data rates that are achieved with ADSL. Typically, 26-gauge wire is utilized at a distance up to 10,000 feet from the CO, with 24-gauge wire used for the remaining distance to the subscriber node. Bridged taps are defined as unterminated line segments off the access line, which act as delay lines and induce nulls in the frequency response. Corrosion occurs at poor splices in the lines resulting in increased attenuation. The presence of loading coils preclude the use of DSL, which are placed on long access line to improve voice quality and attenuate frequencies above 4 KHz.

Over non-loaded twisted pairs up to 18,000 feet in length, ADSL can generally support data rates sufficient for high speed Internet access for users. However, ADSL generally does not support servers that require high upstream data rates.

Video compression techniques enable video-on-demand, with image quality comparable to the quality provided by VCRs, over ADSL lines that can support a downstream data rate of approximately 1.5 Mb/s. However, higher quality video requires rates in excess of 3 Mb/s and high definition television (HDTV) requires a data rate of approximately 20 Mb/s, even with a high degree of compression. Thus, high quality video cannot be supported over many ADSL access lines, and HDTV is not compatible with ADSL. Similarly, ADSL is not compatible with the audio/video broadcast capability provided by cable TV systems. Thus, ADSL falls short of being able to support a full range of communication services.

B. VDSL Access Networks

A second variation of DSL is a very-high-speed DSL (VDSL), which is similar to ADSL, except that VDSL involves relatively short access lines that run from the subscriber node to a remote terminal in the subscribers' general geographic area. VDSL supports higher data rates than ADSL. Typically, VDSL is asymrnetric with downstream bandwidth and data rates higher than the upstream bandwidth and corresponding data rates. VDSL is capable of supporting higher data rates than other variations of DSL. VDSL twisted pair access lines from subscriber nodes are terminated in a remote terminal in the subscribers'general geographic area. This remote terminal is then connected to a CO by a fiber optic line. This approach greatly shortens the length of the twisted pair lines and enables VDSL to support high data rates as illustrated in FIG. 3.

For an access line length of 3,000 feet or less, VDSL can provide data rates greater than 20 Mb/s, which is sufficient to support an HDTV channel or several conventional TV channels. However, VDSL by itself can support only a very limited audio/video broadcast capability and cannot support a broadcast capability comparable to that provided by cable TV systems.

BRIEF DESCRIPTION OF THE DRAWINGS

The features will become more apparent upon reading the following detailed description, claims, and drawings, of which the following is a brief description:

FIG. 2 presents a prior art table showing achievable ADSL data rates in relation to the length of a twisted pair access line;

FIG. 3 illustrates a prior art table showing achievable VDSL data rates in relation to the length of a twisted pair access line;

FIG. 9 presents a table showing three options for combining services offered to subscribers;

DETAILED DESCRIPTION OF THE PREFERRED EMBODIMENTS

Figure 1:
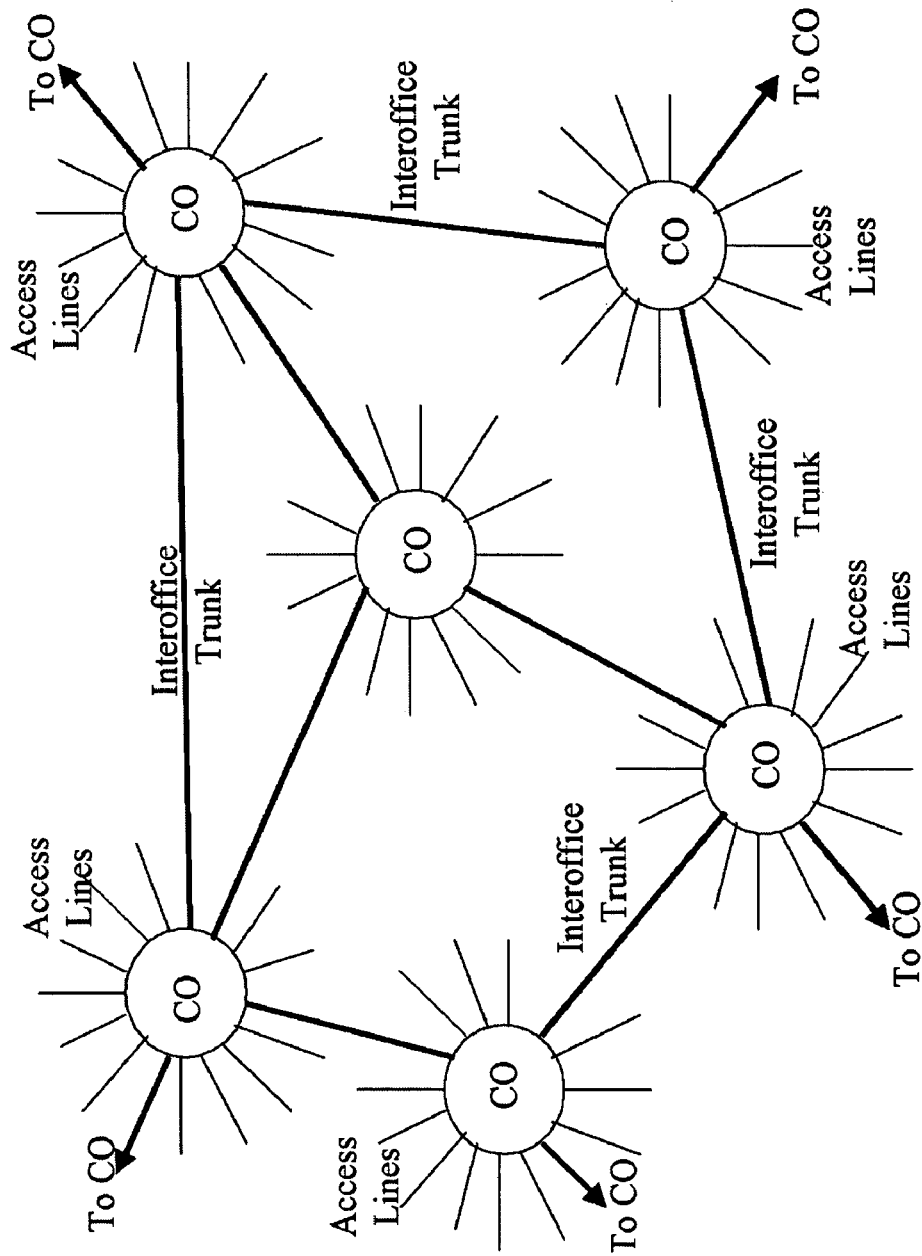
FIG. 1 illustrates a prior art small scale telephone network.

Referring now to the drawings, preferred illustrative embodiments are presented. Although the drawings represent embodiments, the drawings are not necessarily to scale and certain features may be exaggerated to better illustrate and explain the illustrated embodiments. Further, the embodiments set forth herein are not intended to be exhaustive or otherwise limit or restrict the claimed invention to the precise forms and configurations shown in the drawings and disclosed in the following detailed description.

I. Broadband Access Network

The applicant has recognized the limitations of prior art access networks and the capabilities and limitations of DSL technologies. A broadband access network may be implemented based on fiber-to-the-neighborhood (FTTN) and high rate DSL interfaces on twisted pair access lines of the type used traditionally within a telephone network. It is particularly advantageous in terms of cost and implementation to take advantage of the pre-existing infrastructure of twisted pair access lines. This access network will be able to support a wide range of communication services, including voice communications, data communications, high speed Internet access, audio/video-on-demand, and broadcast audio/video, these three classes of communication services commonly referred to as the "triple play" of services.

An access network based on the methods and architectures would comprise: a geographically distributed array of remote terminals; fiber optic cables interconnecting the remote terminals within the array and connecting the array to one or more telephone central offices (COs); twisted pair telephone lines connecting each remote terminal to a set of subscriber nodes in its immediate vicinity. The distance between a subscriber node and a remote terminal is typically less than the distance between a subscriber node and a CO. Each remote terminal in the array would communicate with one or more COs via the fiber optic cables. Each remote terminal would communicate with each of its attached subscriber over a high rate DSL interface.

A. Subscriber Interfaces

Figure 4:
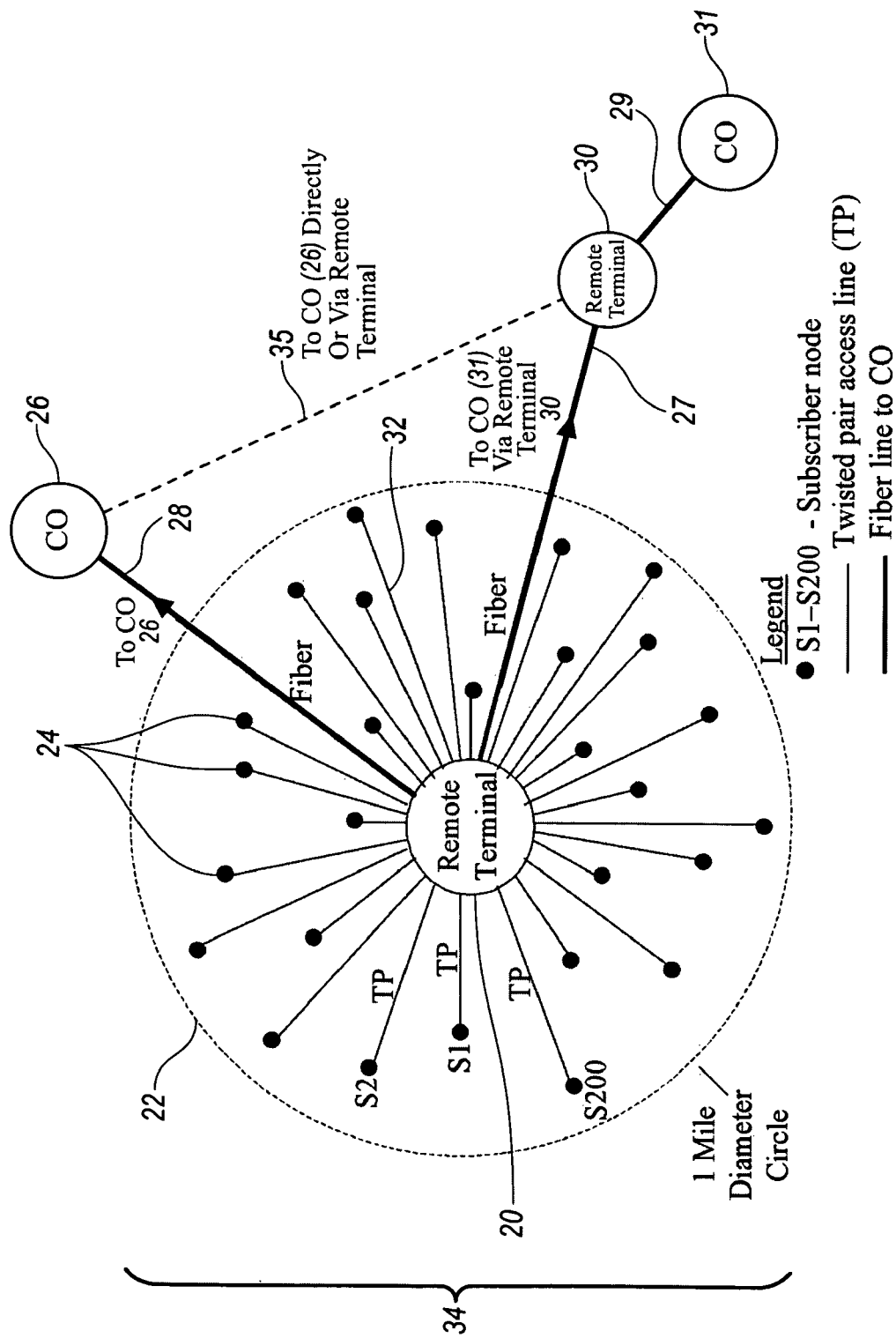
FIG. 4 illustrates the connections between a remote terminal and a set of subscribers and between the remote terminal and telephone central offices.

FIG. 4 illustrates connections between a remote terminal 20 and a set of subscriber nodes 32. The remote terminal is connected by twisted pair access lines to set of subscriber nodes in a hub and spoke configuration. In the embodiment shown by FIG. 4, subscriber nodes 32 within an area of one mile in diameter 22 are connected to the remote terminal. In sparsely populated areas, the service area of a remote terminal would remain approximately the same; however, the remote terminal would be connected to fewer subscriber nodes than the number (200) shown in FIG. 4. In densely populated areas, a remote terminal would connect to more subscriber nodes over a smaller area.

VDSL interfaces would be provided on the twisted pair access lines connecting a remote terminal to subscriber nodes. Downstream data rates of 26 Mb/s are proposed for these interfaces. The prior art table presented in FIG. 3 indicates that downstream data rates in excess of 30 Mb/s can be supported by a twisted pair access line when the length of this access line is generally half a mile or less. Thus, the proposed downstream rates are feasible for the configuration illustrated by FIG. 4.

Preferably, the connection between a subscriber node and remote terminal would employ existing twisted pair access lines, including existing distribution cables, from the remote terminal to the curb, and existing drop cables from the curb to the subscriber premise. The use of existing access lines greatly reduces the cost of deploying the access network.

In most cases, there would only be a single connection 32 between a subscriber node 24 and a remote terminal. A failure of this connection would disable services for the subscriber. For subscribers requiring very high reliability, a second connection would be provided, preferably to a different remote terminal.

B. Remote Terminal to CO Connections and Communications

In the embodiment shown in FIG. 4, remote terminal 20 is directly connected by a high speed transmission media as illustrated in the embodiments herein as a fiber optic line 28 to CO 26 by way of an interface. In many cases, the connection between the remote terminal 20 and the CO 26 will pass through one or more other remote terminals.

Communications between the remote terminal 20 and the CO 26 would be established over the fiber optic line 28 between the remote terminal 20 and the CO 26. These communications would include: downstream traffic destined for the subscriber nodes 24 attached to the remote terminal 20; upstream traffic from the attached subscriber nodes 24; and audio/video broadcast signals. Broadcast audio/video would be replicated in the central offices (COs) and sent to the remote terminals 20 connected to the CO 26. This would enable the CO 26 to support the broadcasting capability by receiving a single broadcast signal (containing multiple broadcast channels).

As shown in FIG. 4, redundant connections may be provided in the access network 34 to protect against failure. Remote terminal 20 is indirectly connected to a second CO 31 via another remote terminal 30. If the connection between the remote terminal 20 and CO 26 fails then remote terminal 20 would receive downstream data from the second CO 31 via the fiber optic lines 27 and 29. Remote terminal 20 would switch upstream data onto the fiber optic line 27 connected via remote terminal 30 and fiber optic line 29 to the second CO 31. Alternatively, a second connection from remote terminal 20 to the first CO 26 may be provided. This second connection could pass through remote terminal 30 and possibly through another remote terminal, as indicated by the dashed line 35 in FIG. 4.

Fiber optic cables 26, 27, and 29 in FIG. 4 would replace existing twisted pair feeder cables, which run from the CO to the subscriber neighborhoods. A typical feeder cable containing hundreds of twisted pairs could be replaced by a single fiber within a fiber optic cable. For a given number of subscribers, the number of required fiber optic cables would be small compared to the number of access lines supported and small compared to the number of fiber lines needed to deploy FTTP.

C. Access Network Topology

Figure 5:
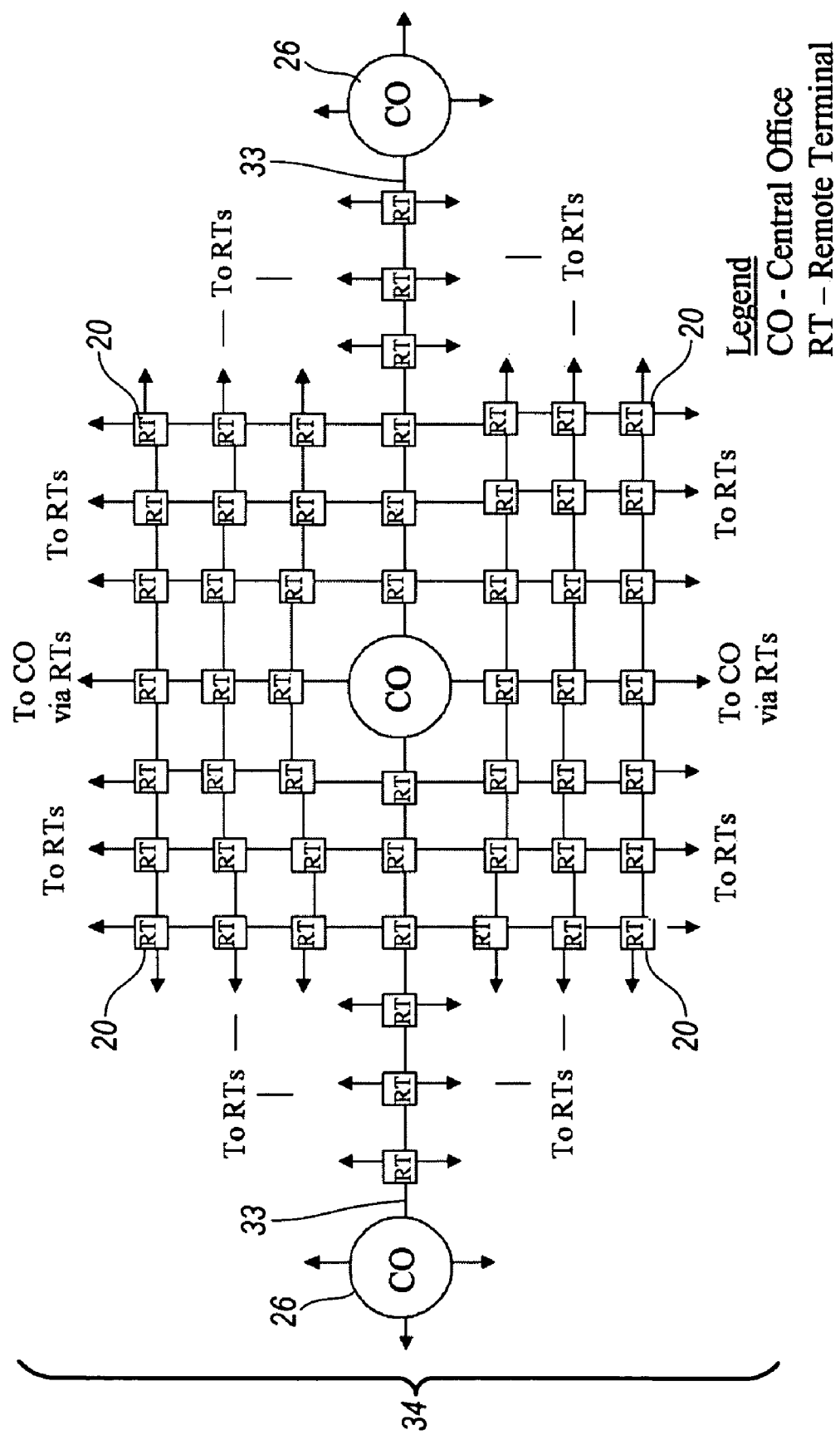
FIG. 5 illustrates an array of remote terminals connected to central offices.

The access network 34 as illustrated in FIG. 5 shows an array of remote terminals 20 interconnected by fiber optic cables 33 with the remote terminals unevenly distributed in two-dimensional space. The distribution of subscriber nodes 24 and remote terminals 20 generally follows a population distribution. The number of subscriber nodes 24 supported by the remote terminal 20 is larger in heavily populated geographical areas 22 than in lightly populated geographical areas 22. The distribution of remote terminals 20 is more uniform than a population distribution. The remote terminals 20 are distributed on a two-dimensional grid, which is not necessarily rectangular.

The remote terminals 20 and interconnecting fiber optic cables 33 in FIG. 5 are arranged in a mesh topology, which facilitates establishing connections and provides redundancy. Each remote terminal within the array would be connected by fiber optic cables 33 to two or more other remote terminals in the array. The array would be connected to one or more COs 26 by fiber optic cables, such that each CO would be directly connected to two or more remote terminals in the array. Each remote terminal in the array would be connected to one or more COs, either directly or through one or more remote terminals. The fiber optic cables 33 in FIG. 5 would be used to support communications between the remote terminals and the COs. For the case where a particular remote terminal is directly connected to a particular CO, communications between these elements would traverse the fiber optic cable directly connecting them. In other cases, communications between a remote terminal and a CO would pass through one or more other remote terminals and would traverse two or more fiber optic cables.

The fiber optic cables 33 interconnecting the remote terminals 20 and COs in FIG. 5 preferably would contain multiple fibers. During installation of the fiber optic line 28 at the remote terminal 20, one or more fibers (not shown) are dropped from a distribution cable (not shown) that is generally routed along a roadway and the remaining fibers are carried to other remote terminals 20 along the access network 34. Generally, a fiber may pass by multiple remote terminals 20 before being used. Fibers that interconnect COs may follow the same routes as the fibers connecting the COs to the remote terminals 20.

D. Remote Terminal Operation

During routine operation, the remote terminal 20 communicates with a set of subscriber nodes 24 via twisted pair lines 32 and with at least one CO 26 via fiber optic line 28 as shown in FIG. 4. As discussed above, if a relevant failure occurs on the fiber optic line 28 or at CO 26 itself, then signals from the subscriber nodes 24 connected to the remote terminal 20 are switched onto an alternate fiber optic line 27 connected to a second CO 31 directly or by way of an alternate remote terminal 20. Similarly, signals from CO 31 are utilized instead of signals from CO 26.

It is contemplated that the remote terminal 20 includes one or more data storage units, one or more signal processing elements, one or more fiber optic lines 28 and 29, and a plurality of high rate DSL interfaces over twisted-pair lines 32. The remote terminal 20 provides the capability to receive signals on the fiber optic lines 28 from CO 26 and to resolve signal components. The remote terminal 20 extracts the data from the signal components and sends the data over the DSL interfaces such as at the outputs of VDSL interface units 78 to subscriber nodes 24. Signals are received on DSL interfaces from a plurality of subscribers. The data is extracted from these signals. The data is then multiplexed, aggregated, and sent over the fiber optic line 28 or 29 to COs 26 or 31. The remote terminal further provides the capability to send distinct signals to each attached subscriber node 24 and to receive audio/video broadcast signals containing a plurality of channels from one or more COs 26 for selective independent switching of one or more audio/video broadcast channels from a larger set of channels onto each DSL interface. The remote terminal 20 uses data received over the DSL interface from a particular subscriber node 24 to control the switching of broadcast channels onto the twisted-pair lines 32 connected to the particular subscriber node 24.

One benefit of providing switching at the remote terminal 20 is that it enables a subscriber node 24 to dynamically select a subset of signals at the remote terminal 20. The capability of switching signals at the remote terminal 20 allows less data to be sent over the twisted pair lines 32 to the subscriber node 24 providing more efficient utilization of the communication line.

In one embodiment, wavelength division multiplexing (WDM) is employed to connect a plurality of remote terminals 20 to the CO 26 by at least one fiber. An example includes connecting up to eight (8) remote terminals 20 to CO 26 using a single fiber carrying nine (9) wavelength channels.

Figure 6:
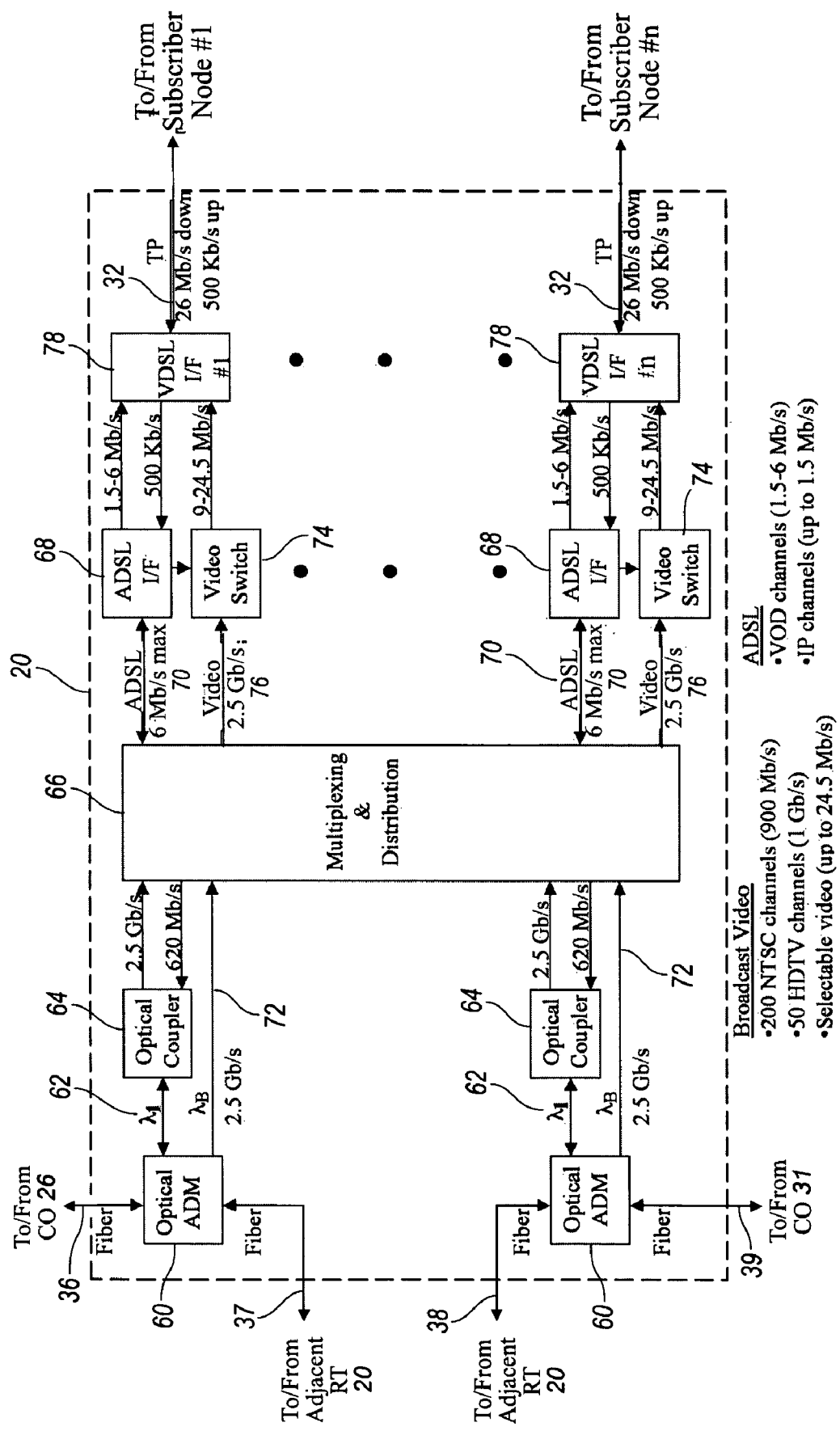
FIG. 6 illustrates a block diagram of a remote terminal with fiber optic and VDSL interfaces and having the capability to perform processing functions required for the access network.

In the embodiment of FIG. 6, a single fiber 36 is used to carry nine wavelength channels. Channels $\lambda_1$ (shown in FIG. 6) through $\lambda_8$ (not shown) are assigned to carry two-way signals between CO 26 and a set of eight remote terminals 20. One of these wavelength channels would be assigned to each remote terminal in the set. The final wavelength channel is a broadcast channel $\lambda_B$ and is assigned to carry broadcast signals between the primary CO 26 and the set of remote terminals 20. Unlike channels $\lambda_1$ through $\lambda_8$, the broadcast wavelength channel $\lambda_B$ is a one-way channel. The number of wavelength channels on the fiber 36 could be increased to support a larger set of remote terminals 20.

Another single fiber 39 with its multiple wavelength channels may be used to support communications between the remote terminal 20 of FIG. 6 and a second CO 31. This same fiber 39 could be used to support communications between CO 31 and other remote terminals.

Figure 7:
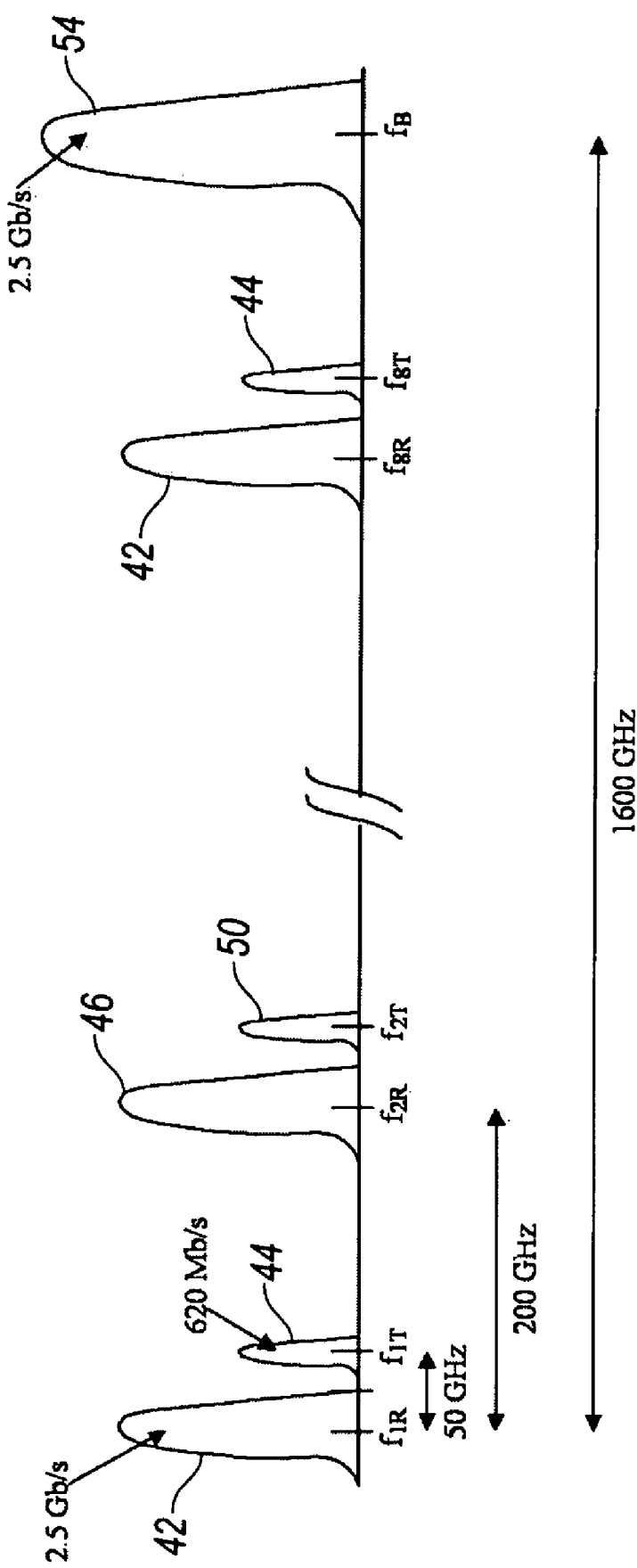
FIG. 7 illustrates a diagram showing a spectrum of a signal on a fiber line connecting a remote terminal to a central office.

FIG. 7 illustrates a spectrum of the signals on a single fiber 36 connecting the remote terminal 20 to its CO 26 in accordance with the embodiment described immediately above. In the illustrated embodiment there are 17 signal components, a transmit, and receive component for each of the 8 wavelength communication channels $\lambda_1$ through $\lambda_8$ assigned to a particular remote terminal 20 and a one-way broadcast component $\lambda_B$. A wavelength channel as shown in FIG. 7 is the channel for one remote terminal 20, where $(f_{1R})$ 42 and $(f_{1T})$ 44 are center frequencies of a receive signal and a transmit signal component for a wavelength channel $\lambda_1$, respectively. Similarly, $(f_{2R})$ 46 through $(f_{8R})$ 48 are the center frequencies of the receive signal for wavelength channel $\lambda_2$ through wavelength channel 18, respectively, and $(f_{2T})$ 50 through $(f_{8T})$ 52 are the center frequencies of the corresponding transmit signal for wavelength channels $\lambda_2$ through $\lambda_8$, respectively. The center frequency of receive-only broadcast channel is $(f_B)$ 54.

In the embodiment of FIG. 6, wavelength channel $\lambda_1$ contains a SONET framed receive signal at frequency $(f_{1R})$ 42 with a data rate of 2.5 Gb/s (OC-48) and a SONET framed transmit signal at frequency $(f_{1T})$ 44 with a data rate of 620 Mb/s (OC-12) as shown in FIG. 7. These data rates include SONET overhead. The SONET signals contain payloads with data for each of the attached subscriber nodes 24. A spacing of 50 GHz between $(f_{1R})$ 42 and $(f_{1T})$ 44 is enough to prevent any significant overlapping of a receive spectra and a transmit spectra. Similarly wavelength channels $\lambda_2$ through $\lambda_8$ contain SONET framed signals. Broadcast channel $(\lambda_B)$ contains a receive only signal with a data rate of 2.5 Gb/s. The center frequencies of the wavelength channels are separated by approximately 200 GHz. This separation is enough to prevent the spectrum of a channel from overlapping the spectrum of an adjacent channel.

FIG. 6 illustrates the operation of the remote terminal 20 communicating via a wavelength channel $\lambda_1$ 62 using signal processing elements. Inside an optical add/drop multiplexer (ADM) 60, the signal on the fiber 36 is demultiplexed and a receive component in the wavelength channel $\lambda_1$ 62 is dropped at the remote terminal 20. The receive components in channels $\lambda_2$ through $\lambda_8$ are passed through the ADM onto fiber 37 and sent to the other remote terminals in the set of eight. Similarly, a transmit component for a wavelength channel $\lambda_1$ 62 is multiplexed or added onto the fiber 36 by the optical ADM 60. The broadcast signal power is split in the optical ADM 60, with some of the signal power being dropped and some of the signal being passed through. The optical coupler 64 combines the transmit and receive signals on a common fiber connected to the optical ADM 60 with separate transmit and receive fibers connecting the optical coupler 64 to an electronic multiplexing and distribution unit 66. It is contemplated that the electronic multiplexing and distribution unit 66 may be a converter located anywhere on the access network 34.

The multiplexing and distribution unit 66 converts the received optical signals to electronic signals, demultiplexes the component signals in a wavelength communication channel $(\lambda_1)$ 62, and sends the component signals to an ADSL interface unit 68. The ADSL interface unit 68 does not perform conventional ADSL functions, but instead performs functions in support of services similar to conventional ADSL services. Similarly, signals and data associated with the ADSL interface unit 68 are referred to as ADSL signals and ADSL data, respectively, even though they do not follow conventional usage of these terms. Component signals received from the ADSL interface unit 68 are multiplexed together in the multiplexing and distribution unit 66 and converted to an optical signal, which is sent to the optical coupler 64. Each ADSL signal 70 preferably has a maximum downstream data rate of 6 Mb/s and maximum upstream data rate of 500 Kb/s. The multiplexing and distribution unit 66 performs statistical multiplexing on the ADSL signal 70. Thus, the composite data rate is less than the product of the maximum data rate times the number of subscriber nodes 24. The total downstream and upstream data rates for 200 subscriber nodes 24 is easily accommodated by the wavelength channel $(\lambda_1)$ 62, which provides rates of 2.5 Gb/s downstream and 620 Mb/s upstream.

The multiplexing and distribution unit 66 converts the receive-only broadcast signal in channel $(\lambda_B)$ 72 and distributes this signal to each of the video switches 74, which operate in parallel to the ADSL interface units 68 although communication can take place from an ADSL interface unit to the corresponding video switch as shown in FIG. 6 and discussed in further detail below. One or more line drivers in the multiplexing and distribution unit would be employed to transmit the broadcast signal to multiple video switches.

As further discussed below, the broadcast channel 76 supports a plurality of audio/video channels if data compression is employed. The 2.5 Gb/s data rate can easily accommodate 250 video channels and many more audio channels.

ADSL services include high speed Internet access, streaming audio services, and streaming audio/video services, which are described in further detail below. These ADSL services are distinct from the broadcast service. An ADSL interface unit 68 processes ADSL service data and performs the handshaking with the subscriber nodes 24 associated with selection of services. In practice, the data rates for ADSL services are typically 1.5 to 6 Mb/s downstream and up to 500 Kb/s upstream. There is a separate ADSL interface unit 68 for each subscriber node 24. The ADSL interface unit 68 also handles plain-old-telephone service (POTS) and basic rate Integrated Services Digital Networks (ISDN) service. Data associated with these latter services is passed through the ADSL interface unit 68 without alteration or significant delay, and data rates listed above do not include POTS/ISDN data.

The remote terminal 20 includes a separate video switching element 74 for each attached subscriber node 24. It is contemplated that the video switching element 74 includes support for audio streams associated with the video streams and for audio streams by themselves. The video switching element 74 enables a subset of broadcast channels to be transmitted to a particular subscriber node 24. FIG. 6 shows the video switching element 74 selecting a set of broadcast video channels having a composite data rate in the range of 9 to 24.5 Mb/s from a larger set of broadcast channels having a composite data rate of 2.5 Gb/s. A control signal or instruction in the upstream data from the subscriber node 24 is used by the remote terminal to select the desired audio/video channels.

Implementing a high rate DSL interface includes setting up the twisted pair access line 32 from the subscriber node 24 that is terminated in the remote terminal 20. The preferred embodiment for this interface would follow VDSL standards. However, comparable high rate interfaces could be employed instead. In the embodiment of FIG. 6, a VDSL interface unit 78 receives digital data from its corresponding ADSL interface unit 68 and its corresponding video switching element 74 and sends this data over a twisted pair line 32 to the subscriber node 24. It is contemplated that the ADSL interface unit 68 is ADSL-like and may not include all standard interfaces and protocols of standard ADSL. The high rate DSL interface, the VDSL interface unit 78, and the ADSL interface unit 68 each provide the capability of sending and receiving distinct signals to and from each subscriber node 24 respectively. Preferably, the VDSL interface unit is directly connected to the twisted pair line 32. Each remote terminal 20 communicates with its attached subscriber nodes 24 over the high rate DSL interface or the VDSL interface unit 78. The ADSL interface unit 68 and the VDSL interface unit 78 are shown to be located in series. A high rate DSL interface unit (not shown) is contemplated that supports data rates at least equal to the VDSL interface unit 78. The VDSL interface unit 78 receives upstream data from the subscriber node 24 and sends the data to the ADSL interface unit 68. Thus, there is two-way communication between the two DSL interface units. ADSL downstream data and broadcast data are used by the VDSL interface unit 78 to modulate the signal that is transmitted over the twisted pair line 32. The VDSL interface unit 78 demodulates the signal received over the twisted pair line 32 to extract upstream ADSL data. The POTS and the ISDN data is passed through the ADSL interface unit 68 without alteration, except for modulation and demodulation. A high rate DSL is contemplated that includes both the ADSL interface unit 68 and the VDSL interface unit 78.

Figure 8:
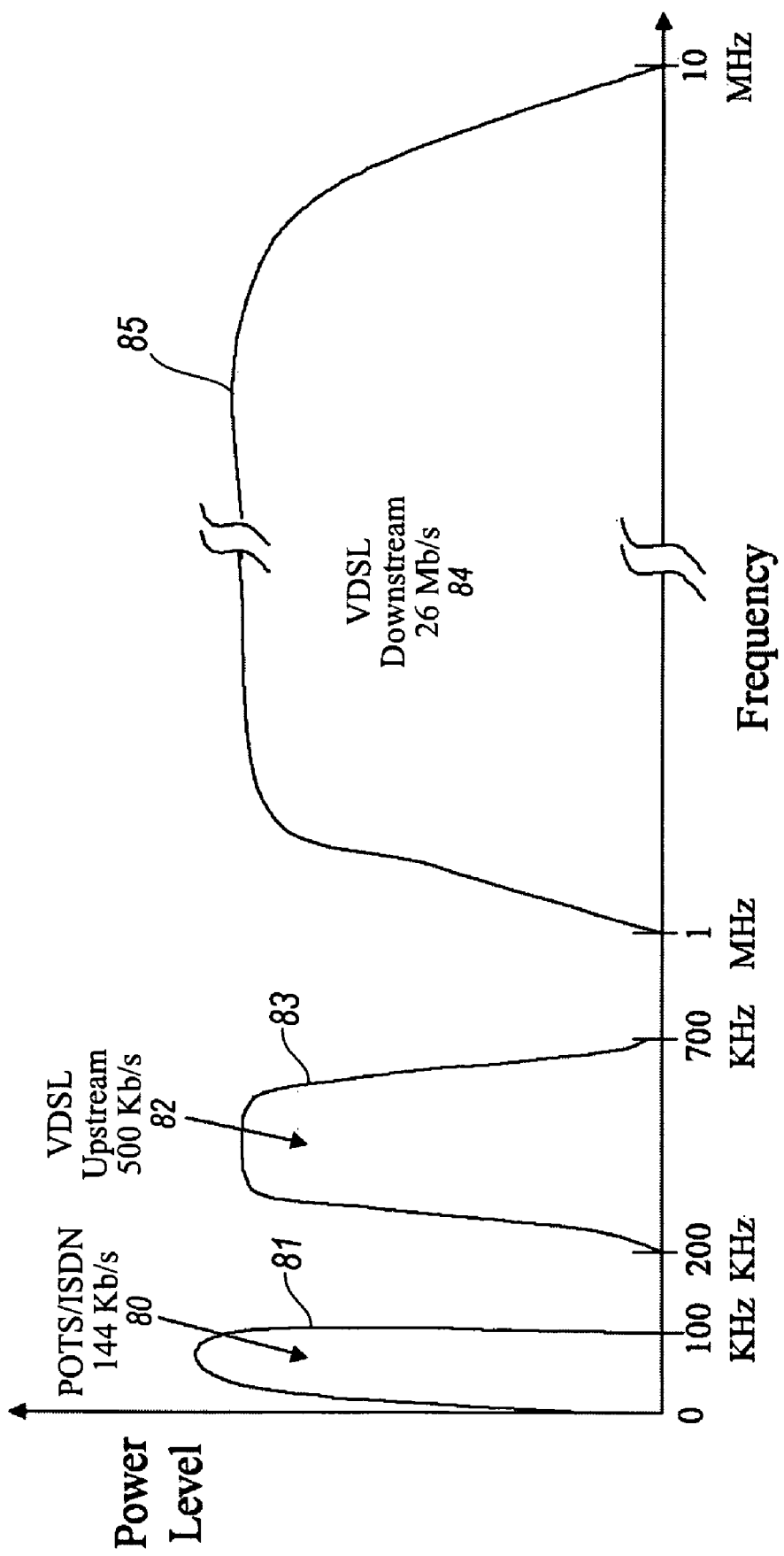
FIG. 8 illustrates a diagram showing a spectrum of a signal on a twisted pair line connecting a remote terminal to a subscriber.

The VDSL spectrum is specified over the range of 200 KHz to 30 MHz. The full VDSL spectral range is typically not employed. FIG. 8 illustrates the VDSL spectrum of the signals employed on the twisted pair line 32 of FIG. 6 connecting the remote terminal 20 to the subscriber node 24. A first frequency band 81 up to approximately 100 KHz is used for POTS, which has an equivalent data rate of 64 Kb/s, and basic rate ISDN, which has an ISDN data rate 80 of 144 Kb/s. A second frequency band 83 from approximately 200 KHz to approximately 500 KHz is used for the VDSL upstream data, which has a maximum VDSL data rate 82 of approximately 500 Kb/s. A third frequency band 85 from approximately 1 MHz to approximately 10 MHz is used for both the VDSL downstream data and the broadcast data, which has a combined maximum VDSL data rate 84 of 26 Mb/s. If a failure occurs and the remote terminal 20 switches over to the secondary CO 31 as illustrated in FIG. 4, then the data rates of the affected subscriber node 24 will be reduced. The remote terminal 20 statistically multiplexes data associated with different services onto the twisted pair access lines. This enables the capacity of the access line to be utilized efficiently. The average data rate on the line is equal to the sum of the average data rates of the services that are simultaneously supported. Clearly, this average data rate must be less than the maximum line rate. However, the sum of the peak data rates of the services that are simultaneously supported does not need to be less than the maximum line rates. This is because generally the peak rates will not all occur at the same time.

To prevent the rate of the supported services from exceeding the maximum line rate, the remote terminal 20 selectively employs a combination of buffering and peak rate limiting. These techniques are employed on the individual data flows associated with particular services.

Buffering smoothes the data flows so that the peak rates are reduced. Memory is included in the VDSL interface unit 78 to enable the buffering of data associated with individual data flows. The amount of buffering that can be employed is limited by the amount of memory in the VDSL interface unit 78 and the fact that delays associated with buffering must be within acceptable limits.

As the aggregate date rate approaches the maximum line rate, the rates of certain data flows would be limited. For most applications, peak rates can be limited with some tolerable degradation in performance. For example, with most applications involving file transfers, the data rate can be reduced, or data transmission can be suspended, when the aggregate data rate is close to the maximum line rate. Peak video data rates would be reduced by discarding data used to enhance the video images when the aggregate data rate is close to the maximum line rate. Methods associated with reducing video data rates are described in a later section.

A combination of buffering and rate limiting would be used to ensure that the maximum line rate is not exceeded while maintaining an acceptable quality of service. The amount of degradation associated with peak rate limiting can be reduced by increasing the amount of buffering. However, increasing the amount of buffering requires more memory and increases delays. The embodiment described here enables tradeoffs between the amount of buffering and the degree to which data rates must be limited, which facilitates supporting a wide range of services over an access line with limited capacity.

The VDSL option described above has the downstream bandwidth and a downstream VDSL data rate 84 greater than the upstream bandwidth and upstream VDSL data rate 82. Other VDSL options are contemplated. If the upstream bandwidth is increased, the upstream VDSL data rate 82 is increased by a roughly proportional amount. One option contemplated is a symmetric VDSL implementation, where the upstream VDSL data rate 82 and the downstream VDSL data rate 84 are both approximately 13 Mb/s and the upstream and downstream bandwidths are approximately equal. To minimize crosstalk from a downstream channel on one twisted pair line 32 to the upstream channel on another twisted pair line 32 in the same cable, the upstream and downstream bands should not overlap. Thus, the asymmetric and symmetric versions of VDSL should not be used within the same cable.

E. Compatibility of FTTN Network with the Interoffice Network

Using the methods and architectures described herein, access networks that are compatible with existing interoffice networks can be constructed. An interoffice network is the network that interconnects the COs. It includes equipment within each of the COs and transmission lines interconnecting the COs. In particular, using an interoffice network compatibility is facilitated by the transporting of data associated with different services within common data flows through the interoffice network. Existing interoffice networks have sufficient capacity to support the data flows through the proposed access network 34 as illustrated in FIG. 5, specifically the data flows associated with support broadcast and individual services for the subscriber nodes 24.

As further discussed above, a composite broadcast signal has a data rate of 2.5 Gb/s. The composite broadcast signal is preferably replicated throughout the interoffice network and in the remote terminals 20. Thus, only a single copy of the composite broadcast signal needs to be transmitted on any access network 34 link.

In an interoffice network as disclosed, the average number of subscriber nodes 24 served by the CO 26 is approximately 12,000. If this many subscriber nodes 24 are operating continuously at a full maximum individual downstream data rate of 6 Mb/s, then the aggregate downstream data rate that is supported by the CO 26 may be approximately 75 Gb/s, which includes broadcast data. However, the actual data rate is less than this theoretical maximum. Not all subscriber nodes 24 are active at the same time, and most subscriber nodes 24 are receiving data at less than the maximum rate. Since statistical multiplexing and demultiplexing is performed in the remote terminals 20, the aggregate data rate at a particular time of day will be close to average data rate for that time of day times the number of active subscriber nodes 24. If 10,000 active subscriber nodes operating at an average downstream data rate of 1 Mb/s excluding broadcast data, then the aggregate downstream data rate that must be supported by the CO 26 is approximately 12.5 Gb/s, which includes 2.5 Gb/s for broadcast data and 10 Gb/s for individual downstream data. The upstream data rate that must be supported by the CO 26 is typically lower than this downstream data rate. With current transport technology, interoffice networks can readily provide the capacity required to support the proposed broadband access networks.

II. Network Services Supported

Services supported by the access network 34 as illustrated in FIG. 4 and FIG. 5 include: POTS, basic rate ISDN, high speed Internet access, audio/video-on-demand, broadcast audio and video, and various Internet Protocol (IP) services, such as high speed Internet access and voice over IP. POTS, ISDN, and Internet access are similar to services currently provided over telephone interfaces using analog, digital, and ADSL interfaces, respectively Video services are the most demanding services in terms of the required capacity of the twisted pair lines 32 as illustrated in FIG. 4 and FIG. 6, and these services require special processing as illustrated in FIG. 6. The access network 34 provides the capability to send audio/video broadcast signals containing a plurality of channels from the COs 26 to the remote terminals 20. The remote terminals 20 provide the capability to switch one or more audio/video broadcast channels for each subscriber onto the subscriber's access line. Each subscriber is provided the capability to select via the DSL interface one or more audio/video broadcast channels from a larger set of broadcast channels.

Audio and video data is generated in continuous streams rather than discrete blocks. For directly encoded digital audio/video, the data rates are fixed, but can be very high. Audio/video compression techniques such as the Moving Pictures Experts Group (MPEG) techniques significantly reduce data rates. For example, with MPEG-2 compression, National Standard Television Committee (NTSC) video rates are reduced from 216 Mb/s to between 3 and 6 Mb/s. Directly encoded High Definition TV (HDTV) video, which has approximately 5 times as many pixels as NTSC video, includes a data rate of approximately 1 Gb/s. However with MPEG-2 compression, the required HDTV data rate is reduced to approximately 20 Mb/s. Streaming audio is typically encoded using MPEG Layer 3 (MP3) and is accommodated with a data rate of 128 Kb/s. Consequently, MPEG compression enables many broadcast channels to be accommodated within the 2.5 Gb/s capacity of the broadcast channel, whose spectrum 54 is shown in FIG. 7 As indicated on the process diagram in FIG. 6, the broadcast channel accommodates 200 NTSC, 50 HDTV, and many audio channels.

MPEG data rates vary from frame to frame and from scene to scene, with scenes containing a lot of motion having relatively high data rates. Buffering of frames is employed to significantly reduce variations in the transmission data rate due to frame-to-frame variations. A transmission rate variation due to scene-to-scene variations is reduced by statistical multiplexing of multiple video channels. MPEG-2 data is separated into base layer data and enhancement layer data. The base layer includes proper video operation. The enhancement layer provides enhanced image quality, but is not required for proper video operation VDSL channel capacity must be sufficient to accommodate the composite base layers of all the video channels transmitted over the VDSL channel. However, the channel capacity does not necessarily need to accommodate the maximum composite data rate of both the base layers and enhancement layers. Instead, if this composite data rate exceeds the channel capacity, the enhancement data for one or more video channels can be dropped and the associated images would suffer some temporary graceful degradation.

Many combinations of services can be supported over VDSL access lines. Three options for combining the VDSL services are illustrated in FIG. 9. POTS/ISDN services may be supported and are contemplated for each option shown in FIG. 9.

Referring to FIG. 9, a first example includes service option 1 that contemplates that the broadcast data rate is 24.5 Mb/s and the downstream ADSL data rate is 1.5 Mb/s. Service option 1 supports one HDTV broadcast channel at 20 Mb/s and one NTSC audio/video broadcast channel at 4.5 Mb/s with MPEG-2 compression. Multiple MP3 audio broadcast channels may be substituted for the NTSC video channel.

Service option 1 also supports one MPEG-1 video-on-demand (VOD) channel at 1.5 Mb/s. High speed Internet access for a plurality of IP service components and multiple MP3 audio-on-demand channels may be substituted for this video-on-demand channel.

A second example includes service option 2 that contemplates that the broadcast data rate is 20 Mb/s and the downstream ADSL data rate 6 Mb/s. Service option supports one HDTV broadcast channel at 20 Mb/s and two MPEG-2 video-on-demand channels at 3 Mb/s each. Multiple NTSC broadcast channels may be substituted for the HDTV channel. High speed Internet access for multiple IP components and multiple MP3 audio-on-demand channels may be substituted for a video-on-demand channel.

A third example includes service option 3 that contemplates that the broadcast data rate is 13 Mb/s and the downstream ADSL data rate 13 Mb/s. Service option 3 supports three NTSC video broadcast channels at 4.5 Mb/s each and three MPEG-2 video-on-demand channels at 4.5 Mb/s each. High speed Internet access for multiple IP components and multiple MP3 audio-on-demand channels may be substituted for a video-on-demand channel.

The data rates listed above are nominal rates; the actual rates generally vary. To ensure proper operation, the sum of the maximum rates for the MPEG-2 base layers of the selected channels (including broadcast and on-demand video) should be less than the allocated capacity. For example, the sum of the rates for the HDTV base layer data and the NTSC base layer data are less than 24.5 Mb/s in service option 1 illustrated in FIG. 9. Excess capacity can be utilized by the enhancement layers. The excess capacity may be less than the sum of the maximum rates of the enhancement layer. In the case of service option 1, if the maximum enhancement layer rates for the HDTV and NTSC video channels occur at the same time, then the enhancement layer data for one of the channels may need to be dropped. As the number of video channels increases, statistical multiplexing provides a greater advantage, and the probability of exceeding the excess capacity, and suffering image degradation, decreases. Flow control is used on the Internet access channels to free up more capacity for the video channels when needed. If the remote terminal 20 switches over to the secondary CO 31 as shown in FIG. 4, then the services for each of the options illustrated in FIG. 9 would be scaled back.

The service options described above are suitable for the residential subscriber nodes 24 as shown in FIG. 4. These service options may not be suitable for business customers. In commercial areas, the symmetric VDSL option described above is more appropriate. With the symmetric VDSL option, data rates of 13 Mb/s are provided for both the upstream and downstream traffic, and the broadcast feature, which is used primarily for entertainment, is not supported. This 13 Mb/s data rate could support voice including POTS voice and voice over IP, data transfers from servers, virtual private networks, Internet access, and video teleconferencing. Typically, a particular remote terminal 20 supports either the services associated with asymmetric VDSL or the services associated with symmetric VDSL, but not both.

III. Transporting Data Through the Network

As described above, it is possible to provide an architecture for a network that provides the triple play of services (voice, audio/video, and data communications) over existing telephone lines. The audio/video services include streaming audio/video-on-demand, and broadcast audio/video. As described above, the network can support other services in addition to the triple play services.

A. Connectivity and Data Flow Supporting Triple Play and Other Services

Rather than separate transport networks and/or separate network elements for voice, video, and data communications, it is desirable to have a single integrated network and common network elements. A converged transport network based on multi-protocol label switching (MPLS) is described. This network transports data associated with the various services in a similar manner using common network elements. An end-to-end data flow is established to support a particular service. Larger data flows are established through the interoffice network to support the end-to-end data flows. Multiple end-to-end data flows would be nested within a larger data flow. Data associated with different services would be transported within common data flows.

Figure 10:
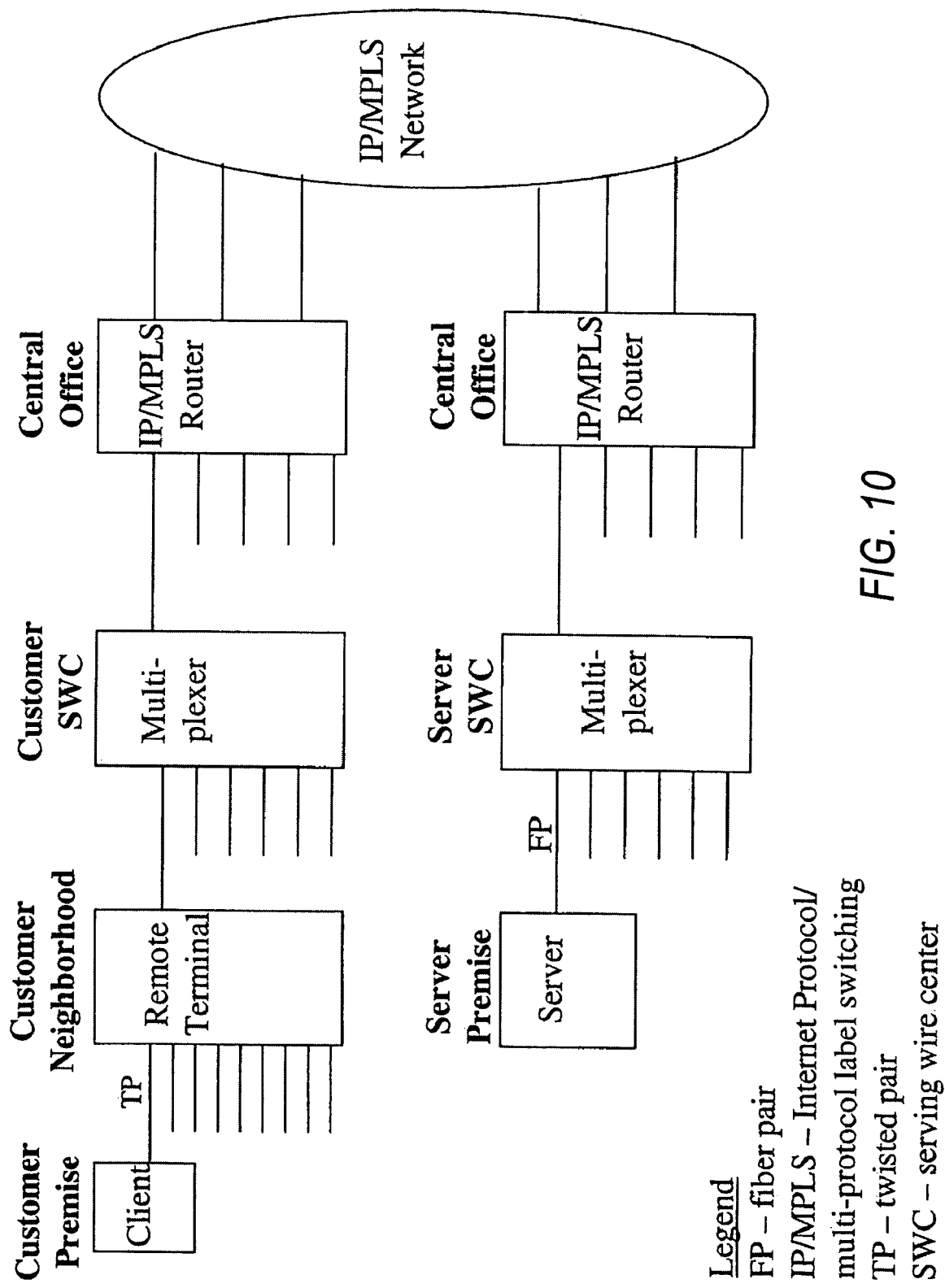
FIG. 10 illustrates a diagram showing network elements supporting end-to-end transport of triple play.

FIG. 10 shows the network elements supporting the end-to-end transport of data associated with the various services and shows how these elements are interconnected. In this case, client equipment at the customer premise is connected through the network to a server, which may be either part of the network or subscriber of the network. Service requests are sent from the client to the remote terminal. Data from multiple subscribers are statistically multiplexed in the remote terminal and forwarded to a central office functioning as a serving wire center (SWC) (end office) for the subscribers. At the SWC, subscriber data from multiple remote terminals is multiplexed and sent to the label switching router in a hub central office. Only a fraction of the central offices would contain routers. All of the central offices would contain multiplexers, which are considerably less complex than routers. Each communication service may be multiplexed at any location including the central office and the remote terminal. The data is sent through the network to another router connected to a server. The data may traverse additional routers within the network.

The multiplexers and routers in the interoffice network are not dedicated to a particular type of service. Instead, these multiplexers and routers are common network elements that process data associated with a wide variety of services.

Typically, servers accommodate a much higher throughput than clients. Therefore servers are often connected to the network by fiber rather than by twisted pairs, as shown in FIG. 10. In this case the server is connected to a multiplexer in its serving wire center (central office) by a fiber pair carrying data to and from multiple clients. The multiplexer combines data from multiple servers and sends this data to a label switching router, which is connected through the network to multiple routers. Each of these routers is connected to a plurality of clients and to other servers.

The transport approach is similar for voice, and audio/video and data communications. Voice, audio/video, and data packets are statistically multiplexed, processed by common network elements, and carried within common network channels. Referring to FIG. 10, voice, audio/video, and data communication packets are statistically multiplexed as follows: on the same twisted pair access line between the subscriber premise and the remote terminal, on a fiber optic cable between the remote terminal and the multiplexer in the CO; over a common network channel between the multiplexer and the router; over a common network channel between routers; over a common network channel between the second router and the second multiplexer; over a fiber optic cable between the second multiplexer and the server. Note the value-added services would be application-specific. Application servers, either within or outside the network, would operate differently in support of voice, audio/video, and data services.

B. Communication Protocols Supporting the Triple Plan and Other Services

Figure 11:
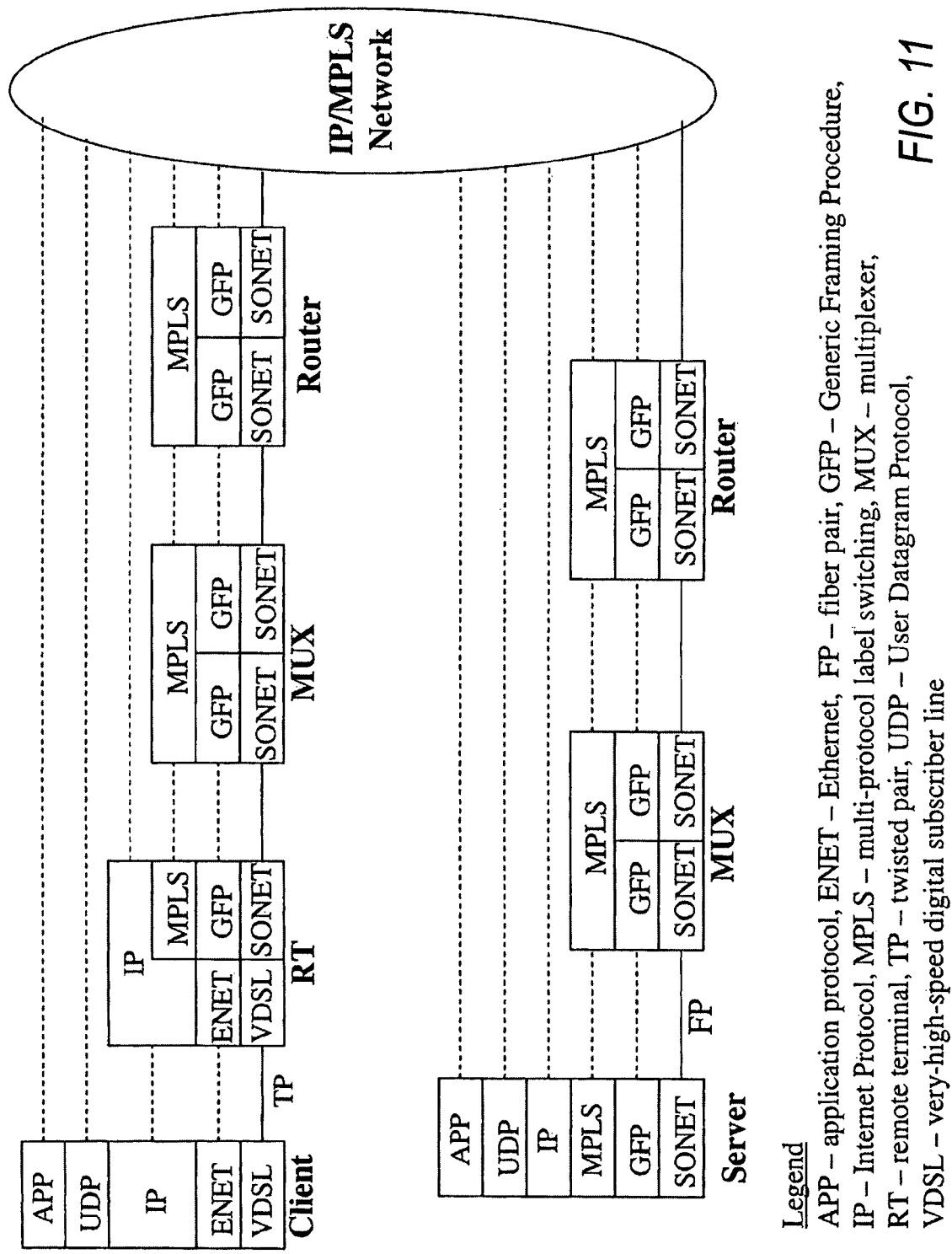
FIG. 11 illustrates a diagram for communication protocols associated with a data flow.

FIG. 11 shows the communication protocols associated with the data flow described above. In this case, illustrated by FIG. 11, a streaming application (APP), such as video, runs over the User Datagram Protocol (UDP). Applications involving file transfers run over the Transmission Control Protocol (TCP). The application protocol and UDP (and TCP) are end-to-end protocols that are seen only by the client and server equipment. UDP (and TCP) runs over the Internet Protocol (IP), which contains global addresses used by conventional routers to establish paths through the network and forward data through the network.

Between the customer premise and the remote terminal, IP is run over Ethernet, which is the predominant local area network protocol and the layer protocol 2 preferred by many subscribers. Ethernet is over VDSL, and both Ethernet and VDSL are terminated in the remote terminal. Functioning similarly to a service edge router, the remote terminal establishes label switched paths (LSPs) to the server for client data flows. Multi-protocol label switching (MPLS) headers that identify LSPs are attached to IP packets at the remote terminal. These MPLS header are used instead of the complete IP address to forward packets through the multiplexers and routers. At the remote terminal IP/MPLS packets are mapped into SONET payloads using the Generic Framing Procedure (GFP) and sent to the SWC. GFP performs layer 2 functions, such as packet/frame synchronization, GFP is the layer 2 protocol between the remote terminal and the multiplexer. Reference: E. Hemandez-Valencia, et al, "The Generic Framing Procedure: An Overview," *IEEE Communications Magazine*, Vol. 40, No. 5, May 2002, the contents of which are incorporated herein in their entirety.

The multiplexer statistically multiplexes upstream IP/MPLS packets from the remote terminals and forwards them to the routers. Conversely, the multiplexer uses the MPLS labels to forward downstream packets received from the router to the appropriate remote terminals. Similarly, the router uses the MPLS label to forward packets (upstream and downstream) to remote terminals or to other routers. Typically, at the multiplexers and routers, IP/MPLS packets are mapped into SONET payloads using GFP. Normally, the routers operate at the MPLS layer and do not need to use the IP header. However, the IP address are used to forward unlabeled packets, and routers in the network that do not have an MPLS capability (legacy routers) are forward packets based on the IP address.

At the server, an MPLS header is attached to an IP packet to enable forwarding of these packets along LSPs. Typically, downstream IP/MPLS packets are mapped into SONET payloads at a server and sent to the multiplexer. At the multiplexer, downstream packets from the server are forwarded to the router, and the MPLS labels a used to forward upstream packets to the server.

The basic approach illustrated by FIGS. 10 and 11 is used for voice, video, and data communications. UDP is used for continuous data flows, such as those associated with voice over IP and video over IP. TCP is used for bursty data flows, such as file transfers. Thus, convergence to IP data and IP/MPLS transport is achieved.

To support voice, audio/video, and data services, separate end-to-end virtual connections would be established. For the case illustrated by FIG. 11, an end-to-end virtual connection would be established between the client at the subscriber premise and the server, which could be either within the network or at the premise of a third party. Simultaneous virtual connections may be established between the client and multiple servers, and/or between the server and multiple clients. To support certain services, such as voice, subscriber-to-subscriber virtual connections would be established.

End-to-end virtual connections would be supported by physical layer connections and virtual connections between network elements. In the case illustrated by FIG. 11, connections supporting the client-to-server virtual connection would include: the twisted pair/DSL physical layer connection between the subscriber and the remote terminal; SONET and MPLS connections between the remote terminal and the multiplexer; SONET and MPLS connections between the multiplexers and the router; SONET and MPLS connections between the routers and the MPLS network; SONET and MPLS connections between the second multiplexer and the server. Typically, a physical connection between network elements would support many end-to-end virtual connections and would support voice, audio/video, and data services. Also, many end-to-end virtual connections associated with different services would typically be nested within a virtual connection between network elements.

IV. Network Capacity

The interoffice network should have sufficient capacity to support the data flows through the proposed access network. An end office (or SWC) provides sufficient capacity to support broadcast and individual services for its attached subscribers.

As discussed above, the composite broadcast signal has a data rate of 2.5 Gb/s. This signal is replicated throughout the interoffice network and in the remote terminals. Thus, only a single copy of this signal is transmitted on any link. In a typical interoffice network, the average number of subscribers served by a CO is approximately 12,000. If this many subscribers are operating continuously at the full individual downstream data rate of 6 Mb/s, then the aggregate downstream data rate that must be supported by a CO would be approximately 75 Gb/s, which includes the broadcast data. However, the actual data rate is much less than this theoretical maximum. Not all subscribers will be active at the same time, and most subscribers will be receiving data at considerably less than the maximum rate. Since statistical multiplexing (and demultiplexing) is performed in the remote terminals, the aggregate data rate at a particular time of day will be close to average data rate for that time of day times the number of active subscribers. If 10,000 active subscribes are assumed operating at an average downstream data rate of 1 Mb/s (excluding broadcast data), then the aggregate downstream data rate that is supported by an end office is approximately 12.5 Gb/s, which includes 2.5 Gb/s for broadcast data and 10 Gb/s for individual downstream data. The upstream data rate that is supported by an end office would typically be much lower than this downstream data rate.

Interoffice network provides the capacity to support the proposed FTTN access networks by current transport technology. Even without WDM, data rates of 10 Gb/s are supported over a single fiber. With WDM, data rates of close to 1 Tb/s over a single fiber are possible.

V. Alternative Embodiments

The claimed invention has been particularly shown and described with reference to the foregoing embodiments, which are merely illustrative of the best modes for carrying out the claimed invention. It should be understood by those skilled in the art that various alternatives to the embodiments described herein may be employed without departing from the spirit and scope of the invention as defined in the following claims. Alternative embodiments could include, but are not limited to the following: the use of different types of DSL techniques, besides VDSL; the use of different types of virtual connections, besides MPLS label switched paths; the use of different types of physical channels, besides SONET and WDM channels; the use of communication protocols besides those shown in FIG. 11; different implementations of the remote terminal; different ways of interconnecting the remote terminals; different interfaces between the remote terminals and the COs.

It is intended that the following claims define the scope of the invention and that the method and apparatus within the scope of these claims and their equivalents be covered thereby. This description of the embodiments should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A method comprising:
    connecting a remote terminal to a central office using a fiber optic cable;
    connecting said remote terminal to premises of multiple subscribers using twisted pair access lines located between said remote terminal and each of said premises and thereby forming at least a portion of an access network;
    locating said remote terminal with respect to a plurality of said premises using a first distance that is less than a second distance between said plurality of said premises and said central office;
    employing digital subscriber line techniques to communicate over said twisted pair access lines between the remote terminal and said plurality of premises;
    supporting simultaneously a plurality of communication services, including audio/video broadcast services, over said twisted pair access lines;
    statistical multiplexing data associated with said communication services from said twisted access lines connecting said remote terminal to said premises;
    reducing peak data rates by selectively buffering said data prior to being multiplexed onto said fiber optic cable and limiting peak data rates for individual communication services as an aggregate data rate approaches a maximum rate that can be supported by said twisted pair access lines;
    providing the capability to switch audio/video broadcast signals in said remote terminal, such that each premise has access to said signals; and
    enabling a subscriber at said premise to dynamically select at least a subset of said signals from a set of said signals.

2. The method of claim 1 including the step of establishing data flows through said central office and connecting said central office to a plurality of other central offices to form at least a portion of an interoffice network.

3. The method of claim 2, said interoffice network and said access network forming a portion of an overall network and including the step of establishing end-to-end data flows through the overall network supporting said plurality of communication services.

4. The method of claim 3, including the step of transporting data associated with each of said communication services within common data flows through said interoffice network.

5. The method of claim 3, establishing end-to-end virtual connections through said overall network to support said end-to-end data flows.

6. The method of claim 5, further establishing physical and virtual connections through said interoffice network, each of said connections supporting multiple end-to-end virtual connections.

7. The method of claim 6, further including the steps of transporting within common physical and virtual connections and processing using common network elements each of said communication services within said interoffice network.

8. The method of claim 1, wherein said communication services include voice, audio/video, and data communication services, each of said communication services distinct from the other of said communication services.

9. The method of claim 1, for each of said communication services within said access network, further including the steps of multiplexing and processing using common network elements.

10. A remote terminal comprising:
    digital subscriber line interfaces over twisted pair access lines with multiple subscriber premises;
    an interface over a fiber optic cable with a central office;
    one or more signal processing elements that
        demultiplex signals received from the central office and transmit signals destined for a particular subscriber premise over said twisted pair access lines connected to each of the subscriber premises,
        multiplex signals from the subscriber premises and transmit these signals to the central office using said interface, and
        simultaneously support a plurality of communication services including audio/video broadcast services; and
    said remote terminal employing signals received from a subscriber premise to dynamically select a subset of audio/video signals from a set of audio/video broadcast signals and transmitting said subset of audio/video broadcast signals over the twisted pair access line connected to the subscriber premise;
    wherein peak data rates are reduced by buffering data about to be statistically multiplexed, and peak data rates for individual services are limited as the aggregate data rate approaches a maximum rate that can be supported over the twisted pair access lines.

11. The remote terminal of claim 10, wherein said remote terminal statistically multiplexes data associated with said communication services and transmits said multiplexed data over said fiber optic cable to said central office.

12. The remote terminal of claim 10, wherein said plurality of communication services includes voice, audio/video on demand, broadcast audio/video, and data communications.

13. A method comprising:
    locating a remote terminal at a first distance with respect to a subscriber premise using a first communication line that is less than a second distance measured between said subscriber premise and a central office serving said subscriber premise;
    connecting said remote terminal to said central office using a second communication line that operates at a higher speed than said first communication line;
    connecting said remote terminal to said first communication line;
    supporting simultaneously a plurality of communication services over said first communication line;
    switching selectively at least a subset of said communication services in said remote terminal;
    enabling a subscriber at said subscriber premise to dynamically select a subset of signals from a set of signals, said signals associated with said communication services;

statistically multiplexing in said remote terminal data associated with said communication services and transmitting said multiplexed data over said second communication line;

reducing peak data rates by selectively buffering said data prior to being multiplexed onto said second communication line; and limiting peak data rates for individual communication services as an aggregate data rate approaches a maximum rate that can be supported by said first communication line.

14. The method of claim 13, wherein said first communication line is a twisted pair access line and said second communication line is a fiber optic cable.

15. The method of claim 13, including the step of employing digital subscriber line techniques to communicate over said twisted pair access line between said remote terminal and said subscriber premise.

16. The method of claim 13, wherein said communication services include voice, audio/video, and data communications.

17. The method of claim 13, including the step of establishing end-to-end data flows supporting said plurality of communication services such that said end-to-end data flows traverse a twisted pair access line between said subscriber premise and said remote terminal and then between said remote terminal and said central office.

18. The method of claim 17, wherein a plurality of central offices are interconnected by an interoffice network, and further including the steps of:

establishing data flows through said interoffice network, such that each of these data flows supports a plurality of end-to-end data flows; and transporting data associated with said communication services within common data flows through said interoffice network.

19. The method of claim 18, further including establishing end-to-end virtual connections for supporting said end-to-end data flows.

20. The method of claim 19, further including the steps of:

establishing physical and virtual connections through said interoffice network; and each of these connections supporting multiple end-to-end data flows.

21. The method of claim 13, wherein a plurality of central offices are interconnected by an interoffice network, and further including transporting said communication services within common physical and virtual connections through said interoffice network and processing said communication services using common network elements within said interoffice network.

* * * * *